Patented Aug. 22, 1939

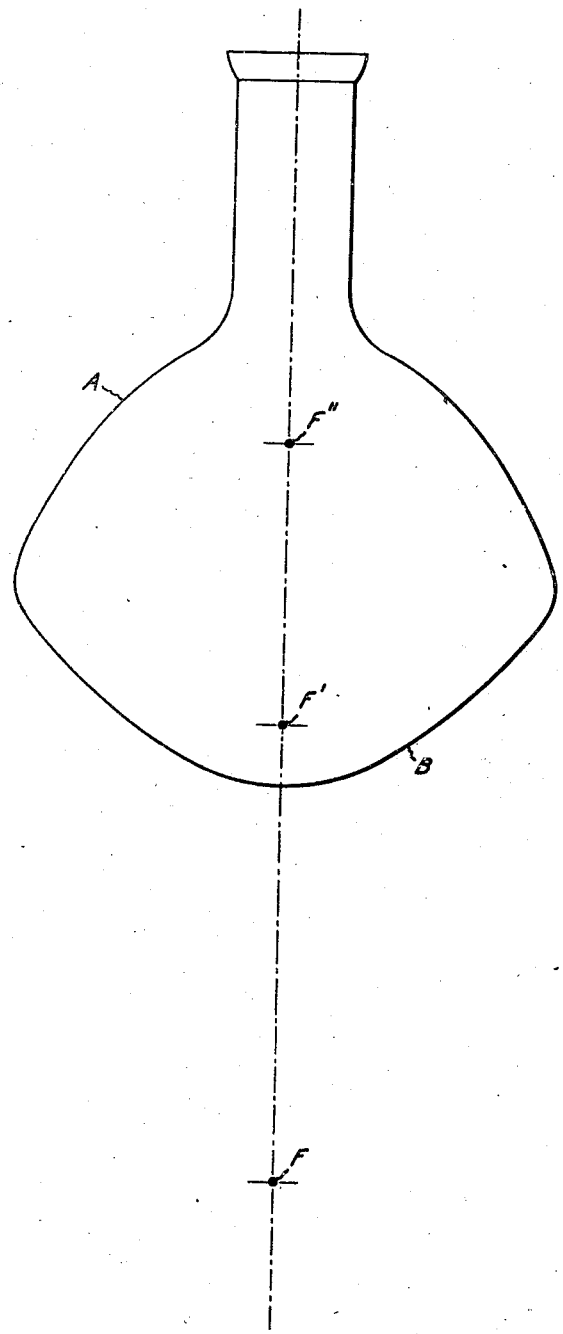

2,170,675

UNITED STATES PATENT OFFICE 2,170,675

LIGHT PROJECTING DEVICE

Jean Bernard Ayral, Paris, France, assignor to General Electric Company, a corporation of New York Application April 7, 1937, Serial No. 135,573
In France April 25, 1936

6 Claims. (Cl. 176—34)

This invention relates to light projecting devices generally and more particularly to a light projector adapted to be operated under water to produce a desired lighting effect.

One of the objects of the present invention is to provide a lamp which may be operated under water without the addition of any special device as a projector for illuminating large quantities of water or any other liquid whether colored or colorless. The device may be used for example for the illumination of luminous fountains to obtain artistic effects. The light radiating outside of the water may likewise be utilized for the illumination of external objects, for instance, the lamp may be immersed in a glass vessel and thus be placed within an enclosure which it is desired to illuminate without raising its temperature.

According to this invention the light projector comprises an enclosure, consisting of a lamp bulb in the case of an incandescent lamp, which comprises two opposing hollow bodies having the surface of revolution about the same axis conjugated in such a way that the light rays reflected by the first surface of revolution, which has a light reflecting surface, are deflected in the desired direction when they leave the second surface as a result of the refraction of the ambient medium.

Where the lamp envelope itself is shaped as described above and is used with a water-proof base, it also has the advantage that the shape of the envelope lends itself readily to molding and is able to withstand the water pressure. Moreover, this envelope can be easily applied and has an excellent efficiency. The light projecting surface may, on the other hand, be incorporated in water-tight illuminating apparatus surrounding the lamp. Other features and advantages of this invention will appear from the following detailed description of a species thereof.

The drawing is a somewhat diagrammatic elevation of a lamp bulb shaped in accordance with this invention.

Referring to the drawing, the lamp bulb comprises a rear ellipsoidal portion A on the base side of the lamp and a front hyperboloidal portion B which has the same axis as the said ellipsoidal portion and is located on the side opposite the base. F and F'' are the two foci of the ellipsoid. The focus F of the hyperboloid is the same as the focus F of the ellipsoid, the second focus of said hyperboloid being located at F'. The filament of the lamp is located at the rear focus F'' of the ellipsoid and is preferably concentrated and arranged in the axis of the bulb. The focus F' of the hyperboloid is so located that the eccentricity of the said hyperboloid is equal to the index of refraction of the air with respect to the water. Under these conditions, and since the ellipsoidal part of the bulb is silvered, preferably internally, the light rays emanating from the rear focus F'' are reflected by the silvered surface toward the second or front focus F of the ellipsoid and are then refracted while passing through the water so as to form a beam of light rays parallel to the lamp axis.

What I claim as new and desire to secure by Letters Patent of the United States is:

1. A light projecting device for operation under water comprising a water-tight enclosure having a light source therein, said enclosure comprising two opposing surfaces of revolution having a common axis, one of said surfaces being light reflecting and the other being transparent, and said surfaces being so conjugated that the light rays reflected from said reflecting surface and passing through said transparent surface are refracted by the surrounding water so as to pass therethrough as a beam of parallel rays.

2. A light projecting device for operation under water comprising a water-tight enclosure having a light source therein, said enclosure comprising a rear ellipsoidal reflecting portion and a front transparent portion, said light source being located substantially at the rear focus of said ellipsoidal reflecting portion to direct light rays toward the front focus of the said ellipsoidal portion, and said transparent portion being so shaped as to cause the light rays reflected from said ellipsoidal portion and passing through said transparent portion to be refracted by the surrounding water so as to pass therethrough as a beam of parallel rays.

3. A light projection device for operation under water comprising a water-tight enclosure having a light source therein, said enclosure comprising a transparent hyperboloidal portion and a concave light reflecting portion so shaped as to cause the light rays reflected therefrom and passing through said transparent portion to be refracted by the surrounding water so as to pass therethrough as a beam of parallel rays.

4. A light projecting device comprising a water-tight enclosure having a light source therein, said enclosure comprising a rear ellipsoidal light reflecting portion and a front hyperboloidal transparent portion having a common axis and said ellipsoidal portion having a rear focus within said enclosure and a front focus in common with one of the foci of said hyperboloidal portion, said light source being located at the rear focus of said ellipsoidal portion.

5. A light projecting device comprising a water-tight enclosure having a light source therein, said enclosure comprising opposing concave portions consisting of a rear ellipsoidal light reflecting portion and a front hyperboloidal transparent portion having a common axis and said ellipsoidal portion having a rear focus within said enclosure and a front focus in common with one of the foci of said hyperboloidal portion located outside of and forwardly of the enclosure, the other focus of said hyperboloidal portion being so located within the enclosure that the eccentricity of said hyperboloidal portion is substantially equal to the index of refraction of air with respect to water, said light source being located at the rear focus of said ellipsoidal portion.

6. A light projecting device comprising a sealed enclosure having a light source therein, said enclosure comprising opposing front and rear concave portions, the rear portion being an ellipsoidal light reflecting portion and the front portion being a hyperboloidal transparent portion, said ellipsoidal and hyperboloidal portions having a common axis and said ellipsoidal portion having a rear focus within said enclosure and a front focus in common with one of the foci of said hyperboloidal portion located outside of and forwardly of said enclosure, said light source being located substantially at the rear focus of said ellipsoidal portion.

JEAN BERNARD AYRAL.